United States Patent
Gleim et al.

(10) Patent No.: US 6,774,585 B2
(45) Date of Patent: Aug. 10, 2004

(54) DISPLAY CORRECTION WAVEFORM GENERATOR FOR MULTIPLE SCANNING FREQUENCIES

(75) Inventors: Günter Gleim, Villingen-Schwenningen (DE); Friedrich Heizmann, Villingen-Schwenningen (DE); John Barrett George, Carmel, IN (US); Albert Runtze, Villingen-Schwenningen (DE)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 10/168,603

(22) PCT Filed: Dec. 9, 2000

(86) PCT No.: PCT/EP00/12464
§ 371 (c)(1),
(2), (4) Date: Nov. 4, 2002

(87) PCT Pub. No.: WO01/47246
PCT Pub. Date: Jun. 28, 2001

(65) Prior Publication Data
US 2003/0127999 A1 Jul. 10, 2003

(30) Foreign Application Priority Data
Dec. 21, 1999 (EP) .............................................. 99125475

(51) Int. Cl.⁷ ................................................. G09G 1/04
(52) U.S. Cl. .................... 315/371; 370/382; 370/382.1; 370/408

(58) Field of Search .................................. 315/370, 371, 315/368.18, 368.21, 382, 382.1, 408

(56) References Cited

U.S. PATENT DOCUMENTS

| | | | |
|---|---|---|---|
| 4,176,300 A | * 11/1979 | Waehner | 315/371 |
| 4,361,785 A | * 11/1982 | Stapleton | 315/389 |
| 4,916,365 A | 4/1990 | Arai | 315/383 |
| 5,301,025 A | * 4/1994 | Hatano et al. | 348/704 |
| 5,471,121 A | 11/1995 | Elgert | 315/382.1 |
| 5,475,286 A | * 12/1995 | Jackson et al. | 315/371 |
| 6,069,673 A | * 5/2000 | Yoshida et al. | 348/806 |
| 6,351,086 B1 | 2/2002 | George et al. | 315/370 |
| 6,586,895 B2 | * 7/2003 | Weber | 315/370 |

FOREIGN PATENT DOCUMENTS

| | | |
|---|---|---|
| DE | 19754905 | 2/1999 |
| EP | 554 836 A2 | 8/1993 |

* cited by examiner

Primary Examiner—Haissa Philogene
(74) Attorney, Agent, or Firm—Joseph S. Tripoli; Harvey D. Fried; Christine Johnson

(57) ABSTRACT

A method for generating display correction waveforms for a CRT display comprises the steps of selecting one of a plurality of trace portions for forming part of a correction waveform, the trace portions having different average values. Completing each of the correction waveform by combining each selected trace portion with a respective retrace portion such that all completed correction waveforms have a predetermined average value. The correction waveforms may have vertical and/or horizontal rates.

18 Claims, 3 Drawing Sheets

DISPLAY CORRECTION WAVEFORM GENERATOR FOR MULTIPLE SCANNING FREQUENCIES

This application claims the benefit under 35 U.S.C. §365 of International Application PCT/EP00/12464 filed Dec. 9, 2000, which claims the benefit of European Application No. 99125475.6, filed Dec. 21, 1999.

BACKGROUND OF THE INVENTION

Field of the Invention

This invention relates generally to correction waveform generation in an image display, and more particularly to a waveform generator operable at a plurality of display standards.

Waveforms comprising multiple frequency components frequently include a DC component which renders the signal essentially unipolar. However, removal of the DC component, for example, by capacitive coupling results in the loss of the unipolar characteristic with the resultant waveform being disposed equally in area, positively and negatively about an average waveform value. This average value is dependent on the waveform shape, thus when AC coupled waveforms with differing shapes produce differing average values with respect to the waveform peaks. Hence the AC peak potentials received by the circuitry following the AC coupling are altered, and vary in accordance with differing waveform shapes.

In an exemplary cathode ray tube the distance from the center of electron beam deflection is, in general, shortest to the center of the display screen, with the distance increasing to maximum values in the screen corners. Thus to achieve consistent beam landing or a focused electron beam over the complete screen area requires that a DC focus voltage is combined with a signal waveform comprising multiple frequencies, for example, horizontal and/or vertical frequency parabolic shaped waveforms. Typically this parabolic waveform is generated with low voltages near the system ground potential and added to the high voltage DC focus voltage via an AC coupling. The amplitude of this parabolic signal has a factory determined value, since the distances between all screen locations and the center of electron beam deflection are known and fixed. Thus, a single focus control, which adjusts a DC potential may be provided to allow optimum focus to be obtained, not only in the screen center, but at all screen locations. Such overall optimized adjustment assumes an accurately determined factory set amplitude value for the generally parabolic shaped signals.

Although the geometric relationship between the display screen and electron beam are fixed and hence not standards specific, a display device may be capable of operation at multiple display standards with various scanning frequencies and differing retrace and blanking times. Thus a parabolic waveform generator is required which is responsive to the display standard, follows the scanning frequency, is capable of differing phasing relative to a vertical retrace pulse and is responsive to differing blanking durations. Such varieties of waveform shaping and phasing consequently vary the AC peaks with respect to the DC component of the waveform. Hence, when this exemplary waveform is ultimately AC coupled for addition to the high DC voltage for DC focus control, the loss of the DC component of the waveform may necessitate readjustment or optimization of the DC focus control voltage. Hence a display operable at multiple scanning and display standards, may require individual focus control adjustment for each display standard.

U.S. Pat. No. 5,471,121 discloses a circuit for generating a dynamic focus voltage. The focus voltage is compared to a reference voltage. Whenever the focus voltage drops below the reference voltage, a switching signal is provided. The switching signal controls a switch, which provides a DC focus voltage during the overscan portions of the trace period. The DC focus voltage has such a value to keep the average value of the focus voltage essentially constant.

In EP-A 0 554 836 a parabolic waveform generating apparatus is described. The known apparatus comprises two memory devices, each storing data necessary for generating parabolic waveforms necessary for the images of a specific aspect ratio. For different aspect ratios an arithmetic logic unit processes the output data of the two memory devices to generate new output data values for a desired parabolic waveform.

DE-A 197 54 904 provides a method for generating a focus voltage for a CRT. The known method comprises the steps of verifying if reference data have changed, calculating correction data and generating a focus voltage according to the correction data.

It is an object of the preset invention to provide a method for generating display correction waveforms for a CRT display. This object is solved by a method according to claim 1. The inventive method comprises the steps of selecting one of a plurality of trace portions for forming part of a correction waveform, the trace portions having different average values. Completing each of the correction waveform by combining each selected trace portion with a respective retrace portion such that all completed correction waveforms have a predetermined average value. Further advantageous modifications of the inventive method are subject of dependent subclaims.

It is another object of the present invention to provide an apparatus having improved focus voltage generation. This object is solved by an apparatus according to claim 1.

It is an advantage of the apparatus according to the invention that independent of the actual waveform modulating the focus voltage a predetermined average value is maintained. In this way a well focused electron beam is yielded over the whole screen area.

An embodiment of the inventive apparatus can be equipped with means for superimposing waveforms for vertical and horizontal focus voltage modulation. It is noted that the maintenance of a predetermined average value of the modulating waveform is achieved for vertical and horizontal focus voltage modulation.

Further advantageous modifications of the inventive apparatus are subject of dependent subclaims.

DETAILED DESCRIPTION

Figure 1:
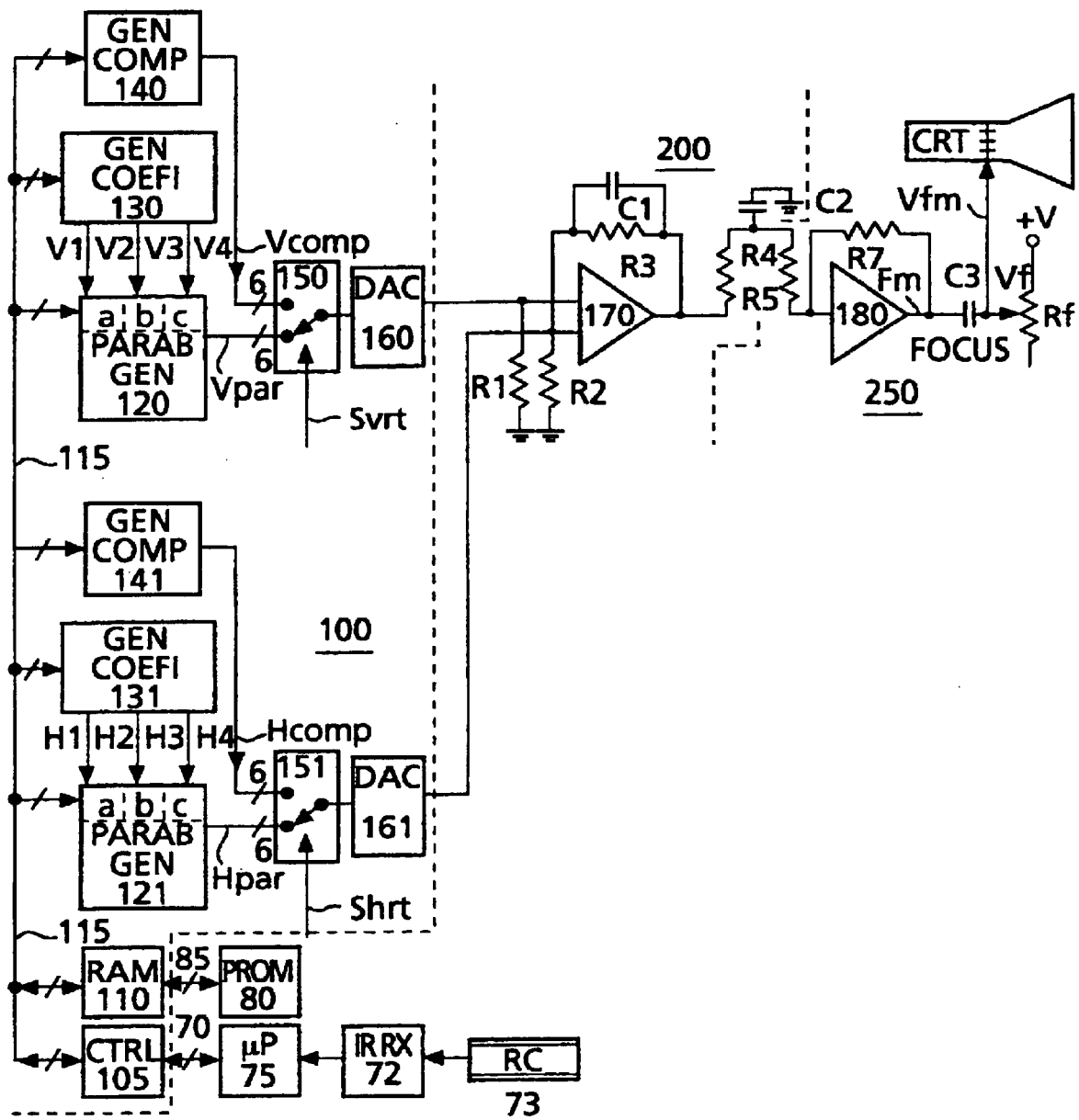
FIG. 1 illustrates an exemplary parabolic waveform signal generator coupled to provide dynamic focus in a cathode ray tube.

An exemplary digital parabolic waveform signal generator is illustrated in FIG. 1, coupled, for example, to provide dynamic focus, or electron beam landing correction in a cathode ray tube. The digital parabolic waveform signal generator is depicted in area 100, which may form part of an inventive integrated circuit, for example, ST Microelectronics type STV2050. The digital waveform generator 100 is coupled to area 200 which includes a differential amplifier and lowpass filter, which is coupled to dynamic focus signal generator 250, and cathode ray tube CRT.

Digital waveform generator 100 includes a digital controller CTRL 105 which controls all functions within generator 100 via data bus 115, and provides control communication via a data bus 70 to an external microprocessor 75. A RAM 110 is connected to an external EEPROM memory (PROM 80) via a dedicated data bus 85 from which it receives operating data at power on. RAM 110 stores operating data values for an exemplary display device, but in particular, data specific to the generation of a parabolic waveform shape. To achieve good results for the display at different scanning frequencies and display standards, the focus voltage is modulated both in horizontal and vertical direction with regard to the beam landing position on the screen. The focus voltage is modulated by parabolic waveforms wherein the waveforms for vertical and horizontal modulation, respectively, are generated separately. Of course it is also possible to modulate the focus voltage only by either a vertical or a horizontal waveform.

At first the vertical parabolic waveform is considered. Data bus 115 supplies vertical parabola specific data from RAM 110 to vertical parabola generator 120, vertical coefficient data to generator 130 and vertical compensation data to generator 140. Parabola generator 120 generates a vertical parabolic waveshape Vpar represented by six bit digital values in accordance with specified amplitude values or coefficients, occurring at specific times during trace or active picture time. Compensation generator 140 forms a six bit digital value Vcomp which is coupled as one input to selector switch 150. Output Vpar from generator 120 is coupled as a second input to switch 150 which is controlled by a vertical rate signal Svrt occurring during a vertical retrace period. Thus switch 150 couples the digital parabolic waveform Vpar to digital to analog converter 160 during active picture, or vertical trace time, and selects digital word Vcomp for digital to analog conversion by DAC 160 during the vertical retrace period. Digital to analog converter 160 generates an analog signal which is coupled to a first input of differential amplifier 170.

In a similar way the horizontal parabolic waveform is generated. Data bus 115 also supplies horizontal parabola specific data from RAM 110 to horizontal parabola generator 121, horizontal coefficient data to generator 131 and horizontal compensation data to generator 141. Horizontal parabola generator 121 generates a parabolic waveshape Hpar represented by six bit digital values in accordance with specified amplitude values or coefficients, occurring at specific times during horizontal trace or line period. Compensation generator 141 forms a six bit digital value Hcomp which is coupled as one input to selector switch 151. Output Hpar from generator 121 is coupled as a second input to switch 151 which is controlled by a horizontal rate signal Shrt occurring during a horizontal retrace period. Thus switch 151 couples the digital parabolic waveform Hpar to digital to analog converter 161 during an active line, or horizontal trace time, and selects digital word Hcomp for digital to analog conversion by DAC 161 during the horizontal retrace period. Digital to analog converter 161 generates an analog signal as a differential output which is coupled to a second input of differential amplifier 170.

Amplifier 170 is configured as a differential input amplifier, with input resistors R1 and R2 of similar values to provide improved stability with temperature. However, it is also possible to manipulate the summing of the input signals by selecting different values for the resistors R1 and R2. Then the input parabolic signals are summed in inverse proportion to the value of the input resistors R1 and R2. In this way an individual weighting coefficient can be assigned to each of the inputs of amplifier 170. The gain of amplifier 170 is determined in part by resistor R2 and R3 and capacitor C1, which provides frequency dependent negative feedback. The analog signal from DAC 160 supplied to the first input of the amplifier 170 is parabolic in shape comprised of up to 64 discrete amplitude levels where each level, or amplitude value is held constant for a number of line periods. These discrete amplitude values, which describe the vertical parabola, are only permitted to change during horizontal retrace periods.

The analog signal from DAC 161 is parabolic in shape as well with a resolution of 64 discrete amplitude levels. The amplitude values change during horizontal trace e.g. at positions corresponding to the horizontal positions of vertical lines of a grid which is used during the setting of convergence correction values. It is possible to adapt the timing of the changes of the focus voltage for horizontal modulation according to the requirements of different modes of operation, for example zoom modes.

The changes in parabolic signal values or steps generate transients which are removed by lowpass filtering resulting from feed back capacitor C1 of amplifier 170 and lowpass filtering at the amplifier output provided by series connected resistor R4 and shunt connected capacitor C2.

Figure 2A:
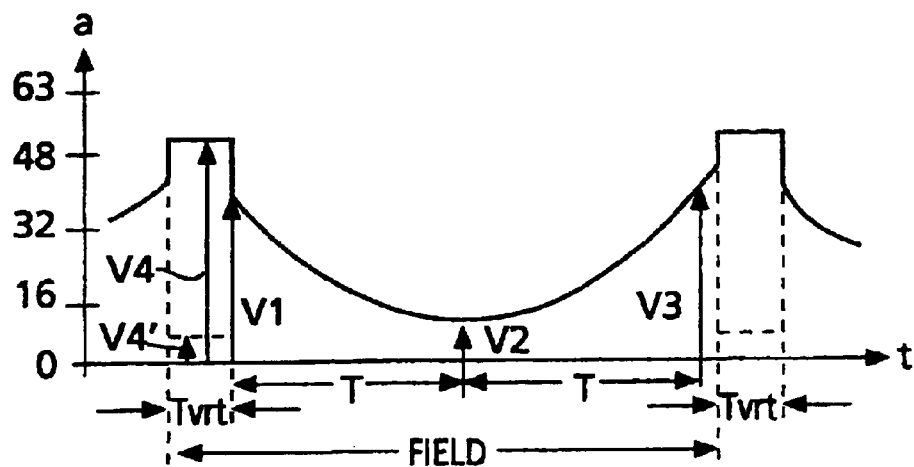
FIG. 2A illustrates a first inventive parabolic waveform.

The lowpass filtered, vertical rate parabolic signal Vpar, depicted in FIG. 2A, is coupled via resistor R5 to amplifier 180 of area 250. As is well known, negative feed back from the amplifier output via resistor R7 forms a low, or virtual earth input impedance. Amplifier 180 also provides voltage gain such that the output signal has an amplitude in the range of approximately 600 V which is coupled via capacitor C3 to the wiper of focus potentiometer Rf. Thus the summed vertical and horizontal rate parabolic signals form a focus modulation signal Fm which is added to the DC focus voltage Vf, for example 8.5 kV, generated by potentiometer Rf and applied as waveform Vfm to the focus electrode of cathode ray tube CRT.

Coefficient generator 130 forms vertical parabola amplitude determining coefficients as three digital words V1, V2 and V3 which set the amplitude of the parabola at specific time intervals to be generated by generator 120. The coefficients are independent of one another but have fixed positions or line counts relative to each other within the period of a field. For example, in FIG. 2A, the time between ordinates V1 and V2 is the same as that between ordinates V2 and V3. A field repetition rate parabola is illustrated in FIG. 2A, with a maximum amplitude defined by 6 bits, giving 64 possible amplitude values. The parabola position or phase within the field period is also adjustable, for example by offsetting a starting point of a counter which determines the time between ordinates V1, V2 and V3. The vertical position adjustment of phasing of the parabolic waveform may be performed by an exemplary remote control RC73 which communicates with microprocessor 75 via an infra red receiver IRRX, 72, or during factory setup by a direct data bus connection to microprocessor 75 (not shown).

Generator 120 performs calculations which cause the generation of a parabola that passes through the three user defined amplitude values. The general form of equation for a parabolic waveform generation is, $$\text{Parabola} = ax^2 + bx + c, \tag{1}$$

where variables a, b, c and Z are calculated as follows from the user defined values for V1, V2 and V3, $$a = 1/Z^2 * (2V3 - 4*V2 + *V1), \tag{2}$$

$$b = 1/Z * (-V3 + 4*V2 - 3*V1), \tag{3}$$

$$c = V1, \tag{4}$$

$$Z = 12 * (VGD + 1), \tag{5}$$

where VGD, vertical grid distance, represents a vertical image dimension measured in scan lines, which may have values between 11 and 63. During setup the parabola amplitude coefficients V1, V2 and V3 are adjusted in conjunction with focus control Rf to achieve optimum overall CRT focus.

Data representing coefficient V4 is read from RAM 115 and formed into digital word V4 by compensation data generator 140. Data switch 150 provides selection between parabola data from generator 130 and compensation data representative of a fixed or DC value from generator 140. Switch 150 is controlled by a vertical rate signal Svrt to select DC compensation data during the vertical retrace period and parabolic waveform data for the active part of the field period. The function coefficient V4 value will be explained with reference to FIGS. 2A, 2B and 2C.

Coefficient generator 131 forms horizontal parabola amplitude determining coefficients as three digital words H1, H2 and H3 which set the amplitude of the horizontal parabola at specific time intervals to be generated by generator 121. The coefficients are independent of one another but have fixed positions relative to each other within the period of a line. For example, the time between ordinates H1 and H2 is the same as that between ordinates H2 and H3. The parabola position or phase within the line period is also adjustable, for example by offsetting a starting point of a counter in the same way as explained for the vertical parabola. The horizontal parabola itself is calculated in a similar way as the vertical parabola by replacing V1, V2, and V3 with H1, H2, and H3, respectively in equations (1) to (4) given above. The parameter Z is selected to be $$Z = 14 \tag{5'}$$

However, it is also possible to select a different value and the invention is not limited to a specific value. It is preferred to utilize values that are easily deductible from the horizontal timing that is required to synchronise the focus voltage modulation with the deflection of the electron beam.

Data representing coefficient H4 is read from RAM 115 and formed into digital word H4 by compensation data generator 141. Data switch 151 provides selection between parabola data from generator 131 and compensation data representative of a fixed or DC value from generator 141. Switch 151 is controlled by a horizontal rate signal Shrt to select DC compensation data during the horizontal retrace period and parabolic waveform data for the active part of the line. The function of coefficient H4 is similar to that of coefficient V4. The explanation will be given below with reference to FIGS. 2A, 2B and 2C.

Figure 2B:
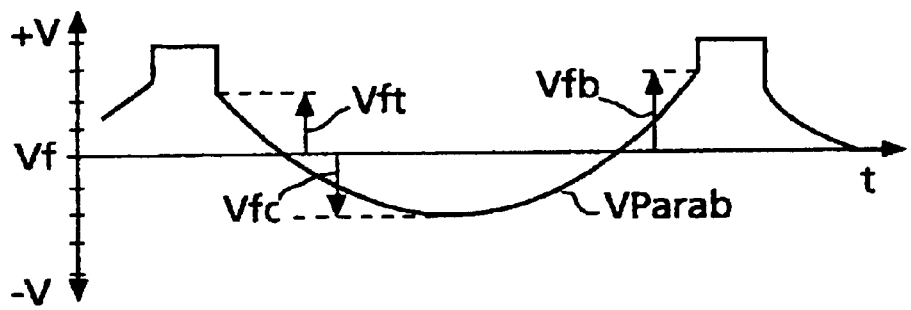
FIG. 2B illustrates AC coupling of FIG. 2A waveform with inventive coefficient V4.
Figure 2C:
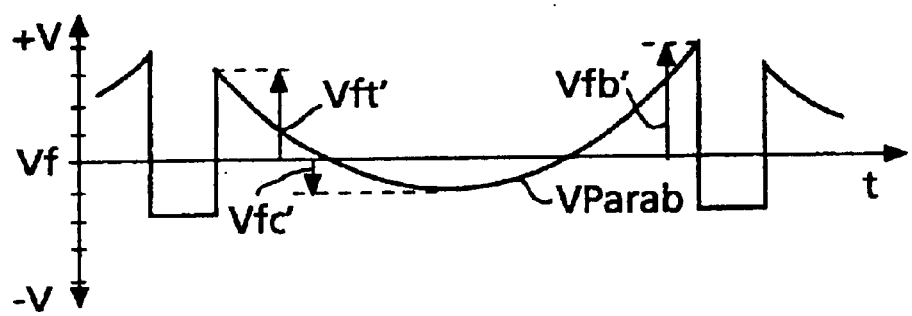
FIG. 2C illustrates AC coupling of FIG. 2A waveform with inventive coefficient V4'.

In FIG. 2A parabolic signal Vpar is illustrated with coefficient V4 having two different values namely V4 and V4' (shown with a dashed line). FIGS. 2B and 2C depict signal Vpar, of FIG. 2A, coupled via amplifier 180 and capacitor C3 to form of focus waveform Vfm. However, since the horizontal component of waveform Vfm is approximately double that of the vertical component, in the interest of drawing clarity FIGS. 2B and 2C show only the vertical rate parabolic component of signal Fm.

The AC coupling of signal Fm by capacitor C3 results in the loss of the waveform DC component, which consequently causes signal Fm to be disposed symmetrically, in terms of waveform polarities, about the DC focus voltage Vf. Thus, as described, with the amplitude of signal Fm being factory determined and preset, exemplary focus control Rf may be adjusted to achieve optimum CRT focus at the screen center by means of peak voltage value Vfc, with focusing at the screen top and bottom being determined by cusp voltages Vft and Vfb respectively. In actuality, if waveform Vfm is appropriately shaped by means of horizontal and/or vertical coefficient value manipulation, optimum focus may be achieved over the whole CRT display surface.

However, as has been described previously, changes in the vertical parabolic signal shape, for example as depicted in FIG. 2A by coefficient V4' shown with the dashed line, cause the mean value to be different. In FIGS. 2B and 2C the parabolic waveforms Vparab are identical in both shape and amplitude. For example, in FIG. 2B if the waveform amplitude is measured relative to the mean or average value by the addition of values Vft+Vfc, this value is equal to the corresponding signal amplitudes Vft'+Vfc' of FIG. 2C. However, since the mean values of the waveforms shown in FIGS. 2B and 2C are different, the optimized center screen focus of FIG. 2B, resulting from the addition of exemplary peak signal amplitude Vfc and DC value Vf is no longer optimum for the waveform depicted in FIG. 2C as a consequence of the diminished peak amplitude of signal Vfc' relative to the mean value of the waveform. In fact the whole screen is defocused as a result of the differing mean values which necessitates readjustment of focus control Rf to restore overall optimum focus.

FIGS. 2B and 2C illustrate that coefficient V4, which is selected during the vertical retrace period and thus plays no CRT electrode control, may advantageously provide compensation for changes in the mean value of focus modulation waveforms generated for differing display or deflection standards. For example, differing display standards may be considered with reference to FIG. 2A, which indicates a field period comprising a vertical retrace or vertical blanking interval Tvrt and active scan period 2T. In the NTSC television signal format, the field period comprises 262.5 horizontal line periods with interval Tvrt representing approximately 20 line periods, thus the ratio of retrace or vertical blanking interval to the field period is approximately 1:13 or 8%. However, in the ATSC 1080I high definition television standard or ANSI/SMPTE standard 274M, a frame comprises 1125 lines with 1080 active line periods. Thus there are 45 lines of non-active picture per frame which in the interlaced format would be distributed between each field comprising 562.5 horizontal line periods. The non-active picture or blanking and vertical retrace interval Tvrt representing approximately 22.5 line periods. Hence the ratio of retrace or vertical blanking interval to the field period is approximately 1:25 or 4% which is approximately half that of the NTSC format. This ratiometric difference in waveform shape or timing may be obviated by advantageous use of coefficient V4 which has differing preset standard specific values, selected to maintain optimum beam landing or focus by compensating for differences in the average value of vertical rate correction waveforms.

Figure 3:
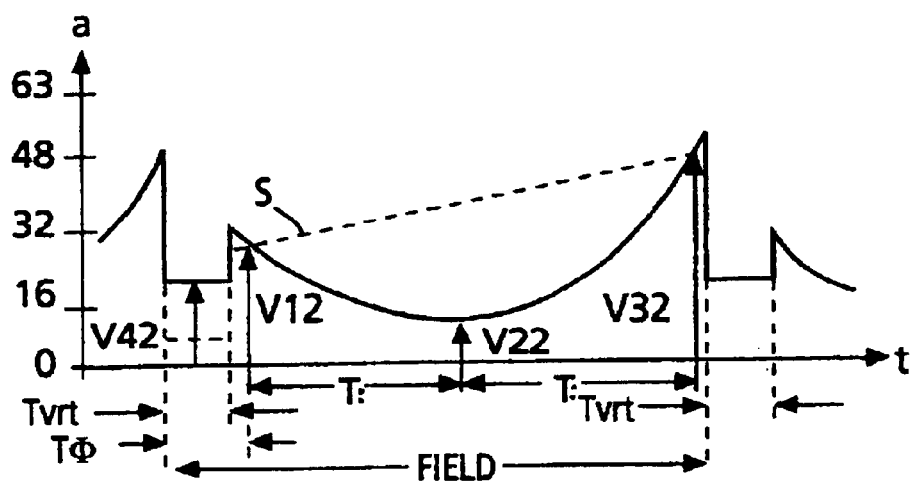
FIG. 3 illustrates a second inventive parabolic waveform.

FIG. 3 depicts a parabolic waveform shape, for example, generated in accordance with a display image having a vertical blanking width different to that of the signal for which the parabolic signal of FIG. 2A was generated. The waveform depicted in FIG. 3 is shaped in accordance with the values of ordinates V12, V22 and V32, where ordinate V12 is delayed or phase shifted by TΦ relative to the start of the vertical retrace interval Tvrt. In addition the waveform shape may be considered to represent a parabola superimposed on a field rate ramp or sawtooth signal as depicted by broken line S. Advantageously compensation data word V42 provides an adjustable signal component which allows differing waveform shapes to have substantially similar DC components, thus facilitating operation at multiple display standards without focus readjustment or multiple focus values.

The same explanation is applicable to the coefficient H4 which is selected to maintain optimum beam landing or focus by compensating for differences in the average value of horizontal rate correction waveforms.

Figure 4:
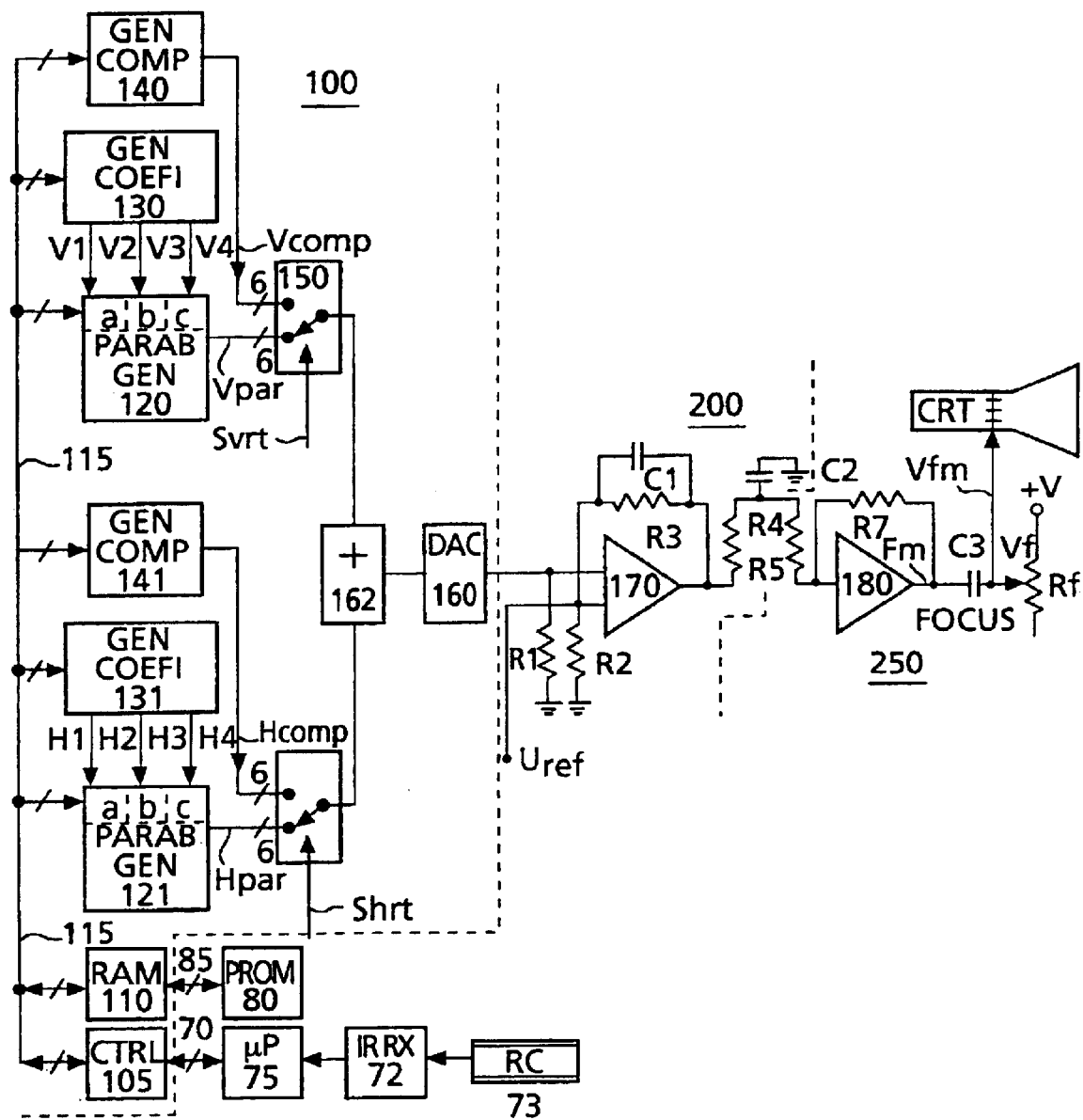
FIG. 4 shows an alternative embodiment of the invention.

FIG. 4 shows an alternative embodiment of the present invention. The main difference compared to the embodiment in FIG. 1 is that the values of the horizontal and vertical parabolas Hpar, Vpar and the compensation coefficients H4 and V4 are added at first in adder stage 162. Subsequently, the sum value is converted into an analog value by DAC 160 and supplied to the first input of differential amplifier 170. The second input of amplifier 170 is connected to a fixed reference potential Uref. The output of amplifier 170 is processed in the same way as described for the previous embodiment. Evidently the embodiment shown in FIG. 4 yields the same effects and advantages as set out above requiring only a single digital to analog converter.

What is claimed is:

1. A method for generating display correction waveforms for a CRT display, comprising the steps of:

generating a first signal, said first signal including a plurality of waveform portions, each waveform portion having a corresponding amplitude value independent from the other portions;

generating a second signal;

selecting said first signal during a trace period;

selecting said second signal during a retrace period;

wherein said selecting is performed by alternately selecting said first signal and said second signal at one of first and second rates to generate said correction waveforms.

2. The method of claim 1, further comprising the step of:

shaping said waveform portions based upon operating characteristics of said CRT display.

3. The method of claim 2, wherein said operating characteristics are represented by values stored in a memory.

4. The method of claim 1, further comprising the step of:

determining generating coefficient values to form said plurality of trace portions based upon values stored in memory.

5. The method of claim 1, further comprising the step of:

adjusting phase values of said waveform portions via a remote control device.

6. The method of claim 1 wherein said first rate is a horizontal deflection rate and said second rate is a vertical deflection rate.

7. Method of claim 1, wherein the step of generating said second signal includes a step of storing in memory a coefficient to be applied to said second signal.

8. Method of claim 1, further comprising a step of assigning a weighting coefficient to each of said correcting waveforms having vertical and horizontal rates, before, superposition of the waveforms.

9. The method of claim 1 further including a step of compensating for differences in average values of respective correction waveforms.

10. The method of claim 9 wherein the step of compensating is carried out by varying said second signal to compensate for said differences.

11. The apparatus of claim 10, further including a correction signal combiner for combining a correction signal having said first rate with a correction signal having a second rate.

12. The apparatus of claim 10, wherein said first generator is responsive to a plurality of coefficient values.

13. An apparatus for generating display correction waveforms for a CRT display, comprising:

a first signal source providing a first signal, said first signal including a plurality of predetermined trace waveform portions, each portion having an average value different from the other portions;

a switch coupled to said first signal source for selecting said first signal during a trace period;

said switch coupled to a second signal source for selecting a second signal during a retrace period;

said switch providing said correction waveforms by switching between said first and second signal sources at one of first and second rates;

said first rate being a horizontal rate and said second rate being a vertical rate.

14. The apparatus of claim 13, wherein said first generator is coupled to a coefficient generator.

15. The apparatus of claim 14, wherein said coefficient generator is coupled to a memory storing operating data values characteristic of said CRT display.

16. The apparatus of claim 13, further comprising a capacitor for AC coupling said correction waveform to said CRT display for correction of electron beam landing errors.

17. The apparatus of claim 13 wherein said first signal is a parabolic signal and said second signal is a compensation signal.

18. The apparatus of claim 13 wherein the amplitude of said trace waveform portions is determined by coefficients generated during said trace.

* * * * *